United States Patent [19]

Reimers

[11] 4,054,827
[45] Oct. 18, 1977

[54] VOLTAGE BOOST CIRCUIT FOR DC POWER SUPPLY

[75] Inventor: Eberhart Reimers, Springfield, Va.

[73] Assignee: The United States of America as represented by the Secretary of the Army, Washington, D.C.

[21] Appl. No.: 676,271

[22] Filed: Apr. 12, 1976

[51] Int. Cl.² .......................................... H02M 3/315
[52] U.S. Cl. ..................................... 363/28; 363/101
[58] Field of Search .................................. 321/20, 2

[56] References Cited

U.S. PATENT DOCUMENTS 3,348,130  10/1967  Jensen ............................. 321/20 X
3,764,887  10/1973  Bingley ........................... 321/20 X Primary Examiner—William M. Shoop
Attorney, Agent, or Firm—Nathan Edelberg

[57] ABSTRACT

A typical "stand alone" precision power DC to AC solid state converter requires a higher DC supply voltage than is usually available from its utility power sources. The disclosed invention is a voltage boost circuit that provides the DC-bus voltage amplitude for precision power DC to AC solid state converters by transforming only the difference between the available raw power DC voltage bus and the required precision DC voltage amplitude. This DC voltage difference obtained by the circuitry of this invention is bootstrapped to the available DC bus to obtain the required precision DC voltage.

11 Claims, 1 Drawing Figure

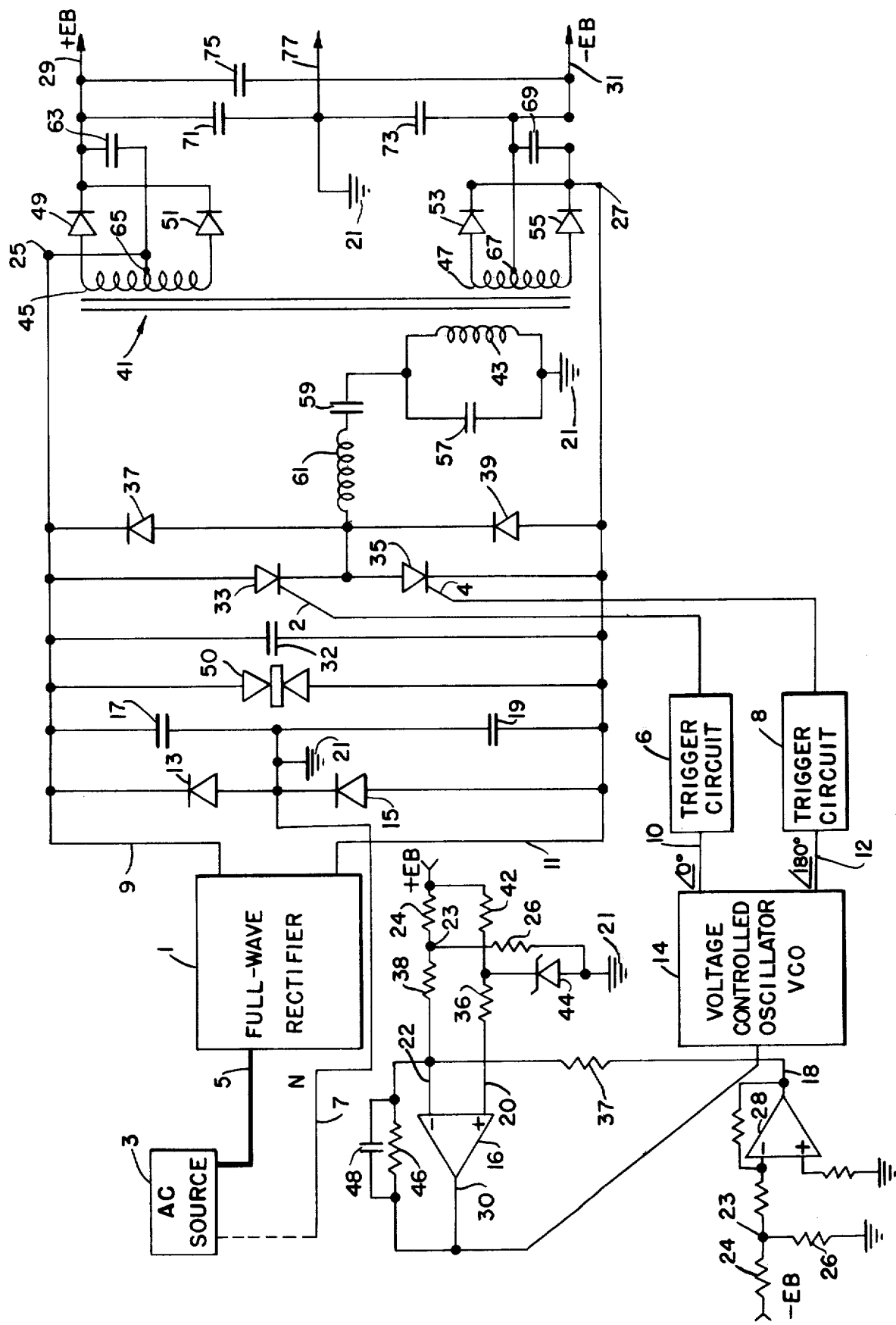

VOLTAGE BOOST CIRCUIT FOR DC POWER SUPPLY

The invention described herein may be manufactured, used, and licensed by or for the Government for Governmental purposes without the payment to me of any royalties thereon.

BACKGROUND OF THE INVENTION

This invention relates to DC to AC converters and more particularly to a voltage boost circuit for providing the required DC bus voltage for precision DC to AC solid state converters.

A typical "stand alone" precision power DC to AC solid state converter requires a higher DC supply voltage than in commonly available from the raw AC power supply prior to rectification. Furthermore, the DC supply must consist of a split DC bus with equal positive and negative bus voltages to utilize a common ground reference with the DC-AC converter, typically consisting of a half bridge switching circuit. In this way a precision AC voltage waveform can be generated (through pulse width modulation of the DC-AC inverter) exhibiting waveform symmetry for the positive and negative half cycle amplitudes above and below the commonly referenced neutral.

Prior art utilizes typically a voltage step-up transformer at the raw power AC input. The secondary winding of the transformer feeds a controlled rectifier bridge of which DC output voltage amplitude is regulated by manipulating the conduction angle of the individual thyristors. This prior art system is relatively cumbersome and costly. Phase back angle control increases circulating currents in the AC power source, generates harmonic current amplitudes, conducted and radiated noise and heat losses.

Another common method of obtaining the required DC amplitude utilizes a high speed DC to DC inverter with a voltage step-up transformer, where the secondary of this transformer is rectified and filtered. The higher DC bus amplitude obtained by this method is maintained constant by manipulating the duty cycle of the high speed inverter. While high power densities have been obtained by this method, it required the transfer of the entire power demand through the DC to DC converter. This results in poor component utilization and is therefore costly.

This invention provides an economical DC to DC transformer by simply transforming only the difference between the available raw DC power obtained through a rectifier bridge which is directly connected to the AC raw power source and the required DC bus voltage. The circuitry of this invention in effect provides two low voltage DC power supplies that are boot-strapped to the raw DC power bus to provide the required DC precision voltage amplitude.

SUMMARY OF THE INVENTION

The circuitry of this invention provides the required split or DC bus voltage amplitude for precision power DC to AC solid state converters, single phase or multiphase with output neutral or common reference. The circuitry can be powered by a single phase or three phase AC supply or by a DC supply returnable to the input neutral or common reference. If an AC power source is utilized, the circuitry must, of course, include a rectifier. If a DC power source is provided, typically a battery or stabilized fuel cell, a rectifier is not necessary; but, it is preferable, though not absolutely necessary, to use a split battery or fuel cell to maintain a neutral or common reference point at the source.

The rectified AC or the DC provides the DC bus voltage which requires boosting from its average DC voltage amplitude to the peak AC voltage equivalent as demanded from the precision power DC to AC solid state converter. The circuitry of this invention provides the required voltage boost by adding a low power DC voltage, obtained from the raw DC power bus voltage, to the raw DC power bus voltage.

The low power DC boost voltage is derived by means of a thyristor or similar inverter which converts the raw DC power to an AC voltage which is coupled to a transformer having a pair of secondaries. The AC voltage in the two transformer secondaries are rectified and boot-strapped to the raw DC power bus. Constant voltage is maintained on the DC output by means of voltage padlock to a voltage controlled oscillator.

As mentioned, the circuitry of this invention can be, by the use of a rectifier, powered from either a three phase or a single phase AC supply. Further, the circuitry of this invention can operate from an AC supply having a neutral conductor or from a raw AC power supply without a neutral conductor. The circuit can be powered by an AC source having a neutral conductor because the circuit provides an artificial neutral by means of a pair of inverse by-pass diodes, commonly called "commutating" diodes; the diodes are either operating alone or in combination with or replaced by a split capacitor filter bank providing "dynamic zero" impedance for each split bus and the entire raw power DC voltage supply.

BRIEF DESCRIPTION OF THE DRAWING

A complete understanding of the circuit details and operation of the invention can be obtained from the following detailed description when read in conjunction with the annexed drawing in which the single FIGURE shows a preferred embodiment of the invention.

DETAILED DESCRIPTION OF THE INVENTION

Referring to the single FIGURE which shows a preferred embodiment of the voltage boost circuit of this invention, the input of the full-wave rectifier is coupled to a raw power alternating current source 3 by means of cable 5. Alternating current source 3 can be either a single phase source or a three phase source and cable 5 is merely a conventional multiconductor cable containing the number of conductors required to couple a single phase source to rectifier 1 or the number of conductors required to couple a three phase source to rectifier 1. Thus, instead of showing a single cable, cable 5 could be shown as a plurality of individual conductors but is shown as a cable since the number of required conductors for a single phase system is less than the number of required conductors for a three phase system. Full-wave rectifier 1 is a conventional full-wave rectifier, for example, a bridge rectifier. If alternating current power source 3 is a three phase source, full-wave rectifier 1 will, of course, have to be a rectifier designed to rectify a three phase source rather than just a more simple single phase rectifier. Lead 7 which is shown as being coupled to alternating current source 3 by a dotted line represents a neutral conductor as is indicated by the letter N. Neutral conductor 7, which as will be explained is an artificial neutral, is shown as being coupled to alternating current source 3 by a dotted line since this conductor is used only if alternating current source 3 has a neutral conductor. Thus, the circuit of the invention can be powered by a single phase or three phase alternating current source having a neutral conductor or by a single phase or three phase alternating current source without a conductor.

The conductive lead 9 is connected to the positive output of full-wave rectifier 1 and the conductive lead 11 is connected to the negative output of full-wave rectifier 1. A pair of diodes 13 and 15 are connected in series between conductors 9 and 11. Neutral conductor 7 is connected to the common point of diodes 13 and 15, to the common point of the filter capacitors 17 and 19 which are connected in series across conductors 9 and 11, with mid-point connected to the ground 21. Diodes 13 and 15 as connected in the circuit are commonly called "free-wheeling" or "commutation"diodes. It is these so-called "free-wheeling" diodes that make it possible to circulate "commutation current amplitudes" in the inverse direction of each rectifier half bridge during phase commutation interval. Diodes 13 and 15 are most effective when operating without split capacitor bank 17, 19 and 32 connected across the raw power DC bus. That is, diodes 13 and 15 and the manner in which conductor 7 is connected to these diodes in place of or in combination with capacitor bank 17, 19 and 32, and the manner in which conductor 7 is connected to these diodes provide the circuit with a neutral conductor which is a created or artificial conductor in that conductor 7 is not in the conventional sense a neutral conductor.

A transient overvoltage suppressor 50, typically a Metal Oxide Varistor or MOV, zener voltage regulating diode, or a diode with controlled avalanche break down characteristic in the reverse connection mode, and a capacitor 32 are also each connected across the raw power DC bus 9 and 11. Up to this point in the circuit, the DC power supply consists of a dynamically balanced positive and negative voltage split bus, comprising equal amplitudes of opposite polarity. Dynamic balance is manifested in the fact that the circuit is capable of a bidirectional power flow from the raw power AC source as well as from the load function for transient power pulse conditions, while maintaining a unidirectional steady state DC power flow from the source to the load. Thus, the filtered output voltage from rectifier 1 appears across the points 25 and 27. Since the circuit of this invention is primarily intended to provide the DC voltage for a "stand alone" precision power DC to AC converter, this unregulated DC voltage across points 25 and 27 needs to be increased to provide the required regulated voltage amplitude EB across leads 29 and 31 which in use would be coupled to the input of the converter.

The balance of the circuitry shown in the single FIGURE provides this voltage boost. This circuitry comprises a pair of thyristors 33 and 35 connected in series between conductors 9 and 11, a pair of diodes 37 and 39 also connected in series between conductors 9 and 11, a transformer 41 having a primary winding 43 and a pair of secondary windings 45 and 47, and a full-wave rectifier made up of the rectifier diodes 49, 51, 53 and 55. A capacitor 57 is connected in parallel with primary winding 43 and the parallel combination of capacitor 57 and primary winding 43 is connected between ground 21 and one side of the capacitor 59. The other side of capacitor 59 is connected to one side of the inductor 61 which has its other side connected to both the common point of diodes 37 and 39 and the common point of thyristors 33 and 35.

Secondary winding 45 has a center tap 65 and secondary winding 47 has a center tap 67. Raw power DC bus 9 is connected to center tap 65. Tap 65 in turn is coupled to output lead 29 through optional capacitor 63. Similarly, raw power negative voltage bus 11 is connected to cathode of rectifiers 53 and 55, while the center tap 67 is connected through optional capacitor 69. A pair of filter capacitors 71 and 73 are connected in series between the leads 29 and 31 and another filter capacitor 75 is also connected between leads 29 and 31. The common point of filter capacitors 71 and 73 is connected to ground and the output lead 77 is connected to common reference point 21.

Rectifier diode 49 couples one end of secondary winding 45 to output lead 29 and rectifier diode 51 couples the other end of secondary winding 45 to output lead 29. Similarly, rectifier diode 53 couples one end of secondary winding 47 to input lead 11 and rectifier diode 55 couples the other end of secondary winding 47 to input lead 11. Center tap of winding 45 is connected to lead 9 at point 25, while center tap of winding 47 is connected to $-E_b$ at 31.

Summing amplifier 16 has a non-inverting input 20 and an inverting input 22. Input 20 is connected to an internal zener voltage reference 44 through resistor 36. Zener voltage reference 44 is energized from $+E_b$ through resistor 42.

Inverting input 22 comprises a summing node for voltage feedback from $+E_b$ as obtained at reference point 23 from a resistor voltage divider network 24 and 26. Summing node 22 is connected through resistor 38 to the $+E_b$ reference 23 and through resistor 37 to output 18 of an inverting, unity gain amplifier 28 whose input is connected to $-E_b$ reference 23. Furthermore, a resistor 46 and capacitor 48 feedback network is connected between summing node 22 of amplifier 16 and its output 30.

Output 30 is connected to the input of the voltage controlled oscillator 14, or VCO. The VCO provides two electrical output signals on the output lines 10 and 12, each 180 electrical degrees phase displaced, which in turn monitor the trigger repetition rate of gate trigger circuits 6 and 8. The output from trigger circuit 6 is coupled to the gate electrode 2 of thyristor 33 and the output from trigger circuit 8 is coupled to the gate electrode 4 of thyristor 35.

As has been mentioned, the circuitry of this invention as just described is primarily intended to provide the DC bus voltage for a precision power DC to AC solid state converter and therefore is designed to provide a voltage boost to the output voltage from full-wave rectifier 1. Also, as mentioned previously, the DC voltage appearing across the points 25 and 27 is the filtered DC voltage from full-wave rectifier 1. This voltage is an unregulated DC voltage and is boosted in amplitude so that the DC voltage EB is higher than this voltage. This voltage boost is accomplished as follows: When power is applied to the circuit by power source 3, thyristors 33 and 35 via gates 2 and 4, respectively, will alternately be gated on by trigger circuits 6 and 8, respectively. When one of the thyristors 33 or 35 is gated "on," the other thyristor is off. The manner in which such circuits operate is well known in the art. The alternate gating of thyristors 33 and 35 provides pulses on primary winding 43 of typically high frequency transformer 41 which are, of course, transformer coupled to the secondaries 45 and 47. Thyristors 33 and 35 are successively turned off by means of natural commutation through resonant interaction of series-parallel LC circuit 59 and 61, and 43 and 57. Thus, the average power and voltage transfer to the secondaries of transformer 41 is dependent on the control frequency as provided by the VCO since the conduction period during each conducting cycle remains fairly constant and is proportional to the half cycle time period of the natural resonance frequency of the LC commutating circuit. The alternate gating on and off of thyristors 33 and 35 converts DC to AC. The rectifier diodes 49, 51, 53 and 55 rectify the AC voltage generated by the gating on and off of thyristors 33 and 35 to a DC voltage. The rectifier diodes 49 and 51 are connected to output lead 29 and line 9 is coupled to the center tap 65 of winding 45. Similarly, rectifier diodes 53 and 55 are connected to line 27, while center tap 67 is coupled to output line 31. Lines 29 and 31 are filtered with optional capacitors 63 and 69 to the raw power bus lines 9 and 11, respectively. Therefore, the DC voltage obtained by rectifying the AC voltage appearing on transformer 41 from the alternate gating of thyristors 33 and 35 is added to the DC voltage obtained from full-wave rectifier 1 to provide voltage ±EB which is higher than the voltage obtained from full-wave rectifier 1. Further, DC voltage ±EB is of substantially a constant value because this voltage is a regulated voltage.

Voltage regulation of DC voltage ±EB is achieved by means of voltage controlled oscillator 14 and the associated summing amplifier circuitry. As noted previously, resistors 24 and 26 present a voltage divider network to present a proportional voltage reference of ±EB at input 22 of operational amplifier 16 where −EB is inverted through unity gain amplifier 28 and thus, obtainable at 18. Thus, a feedback voltage is applied to inverting input 22 of summing amplifier 16 whose output 30 is coupled to the input of voltage controlled oscillator 14 and which output control frequency is proportional to the average of the sum total voltage from the positive split bus (±EB) and the negative split bus (−EB). This type of voltage regulation is well known in the art.

From the foregoing description of the circuitry of this invention and the operation of this circuitry, it should be apparent that this invention provides a voltage boost circuit that will provide the required DC bus voltage for precision powered DC to AC solid state converters. Further, the voltage boost provided is just that needed to obtain the required DC voltage. That is, the DC transformer circuitry, thyristors 33 and 35, transformer 41 and the balance of this part of the circuit is designed to add just enough of a DC boost to the voltage from full-wave rectifier 1 to obtain the required voltage amplitude across output leads 29 and 31.

While the invention has been described and shown with reference to a specific embodiment, it will be apparent to those skilled in the art that various changes and modifications can be made to this specific embodiment without departing from the spirit and scope of the invention as defined in the claims.

What is claimed is:

1. A voltage boost circuit requiring minimum energy transfer to sustain rated power profile comprising:
   a. means for obtaining a first direct current voltage;
   b. a first conductive lead and a second conductive lead coupled to the output of said means for obtaining said first direct current voltage;
   c. means connected between said first and second conductive leads for generating an alternating current voltage which comprises
      a first thyristor and second thyristor connected in series between said first and second conductive leads, said first and second thyristors each having a gate electrode;
      a transformer having a primary winding, a first secondary winding and a second secondary winding;
      means to couple said primary winding to the common point of said first and second thyristors; and
      means coupled to said gate electrode of said first thyristor and the said gate electrode of said second thyristor for alternately gating on said first and second thyristors;
   d. means for deriving a second direct current voltage from said generated alternating current voltage, said means for deriving said second direct current voltage being coupled directly to the first and second secondary windings of said means for generating said alternating current voltage;
   e. a first output lead and a second output lead; and
   f. means to apply said first direct current voltage and said second direct current voltage on said first and second output leads in such a manner that said first and said second direct current voltages are added to form a third direct current voltage.

2. A voltage boost circuit as defined in claim 1 wherein said means for deriving said second direct current voltage from said generated alternating current voltage comprises: a first rectifier diode connected to one end of said first secondary winding, a second rectifier diode connected between the other end of said first secondary winding and said first rectifier diode, a third rectifier diode connected to one end of said second secondary winding and a fourth rectifier diode connected between the other end of said second secondary winding and said third rectifier diode.

3. A voltage boost circuit as defined in claim 2 wherein said means to apply said first and said second direct current voltages on said first and second output leads comprises means to connect the common point of said first and second rectifier diodes to said first output lead, a first coupling capacitor connected between said first conductive lead and said first output lead, means to connect the common point of said third and fourth rectifier diodes to said second output lead and a second coupling capacitor connected between said second conductive lead and said second output lead.

4. A voltage boost circuit as defined in claim 3 wherein a first capacitor is connected in parallel with said primary winding and wherein said means to couple the common point of said first and second thyristors to said primary winding comprises an inductor and a second capacitor connected in series between said common point of said first and second thyristors and one end of said primary winding and one end of said first capacitor, the other end of said primary winding and the other end of said first capacitor both being connected to ground.

5. A voltage boost circuit as defined in claim 4 wherein said means for obtaining said first direct current voltage comprises an alternating current source and a full wave rectifier coupled between said alternating current source and said first and second conductive leads.

6. A voltage boost circuit as defined in claim 1 wherein said means for alternately gating on said first and second thyristors comprises:
- a voltage controlled oscillator having an input and a first output and a second output;
- a first trigger circuit coupled between said gate electrode of said first thyristor and said first output of said voltage controlled oscillator;
- a second trigger circuit coupled between said gate electrode of said second thyristor and said second output of said voltage controlled oscillator;
- a summing amplifier having an output coupled to said input of said voltage controlled oscillator and having an inverting input and a non-inverting input;
- a first resistor coupled between said first output lead and said inverting input of said summing amplifier;
- a voltage follower amplifier having an output coupled to said inverting input of said summing amplifier and having a second output lead connected to its inverting input;
- a second resistor coupled between said inverting input of said summing amplifier and a voltage follower;
- a feedback network coupled between said inverting input of said summing amplifier and said output of said summing amplifier;
- a third and fourth resistor connected between said first output lead and said inverting input of said summing amplifier;
- a fifth and sixth resistor connected between said non-inverting input of said summing amplifier and said first output lead; and
- a Zener diode connected between the common point of said fifth and sixth resistors and ground.

7. A voltage boost circuit as defined in claim 6 wherein said means for obtaining said first direct current voltage comprises: an alternating current source and a full wave rectifier connected between said alternating current source and said first and second conductive leads.

8. A voltage boost circuit as defined in claim 7 wherein said alternating current source is a single phase source.

9. A voltage boost circuit as defined in claim 7 wherein said alternating current source is a three phase source.

10. A voltage boost circuit as defined in claim 8 wherein said alternating current source has a neutral conductor and wherein first and second diodes are coupled in series between said first and second conductive leads and the common point of said first and second diodes is connected to ground and to said neutral conductor.

11. A voltage boost circuit as defined in claim 9 wherein said alternating current source has a neutral conductor and wherein first and second diodes are coupled in series between said first and second conductive leads and the common point of said first and second diodes is connected to ground and to said neutral conductor in combination with a split phase capacitor filter bank.

* * * * *